UNITED STATES PATENT OFFICE.

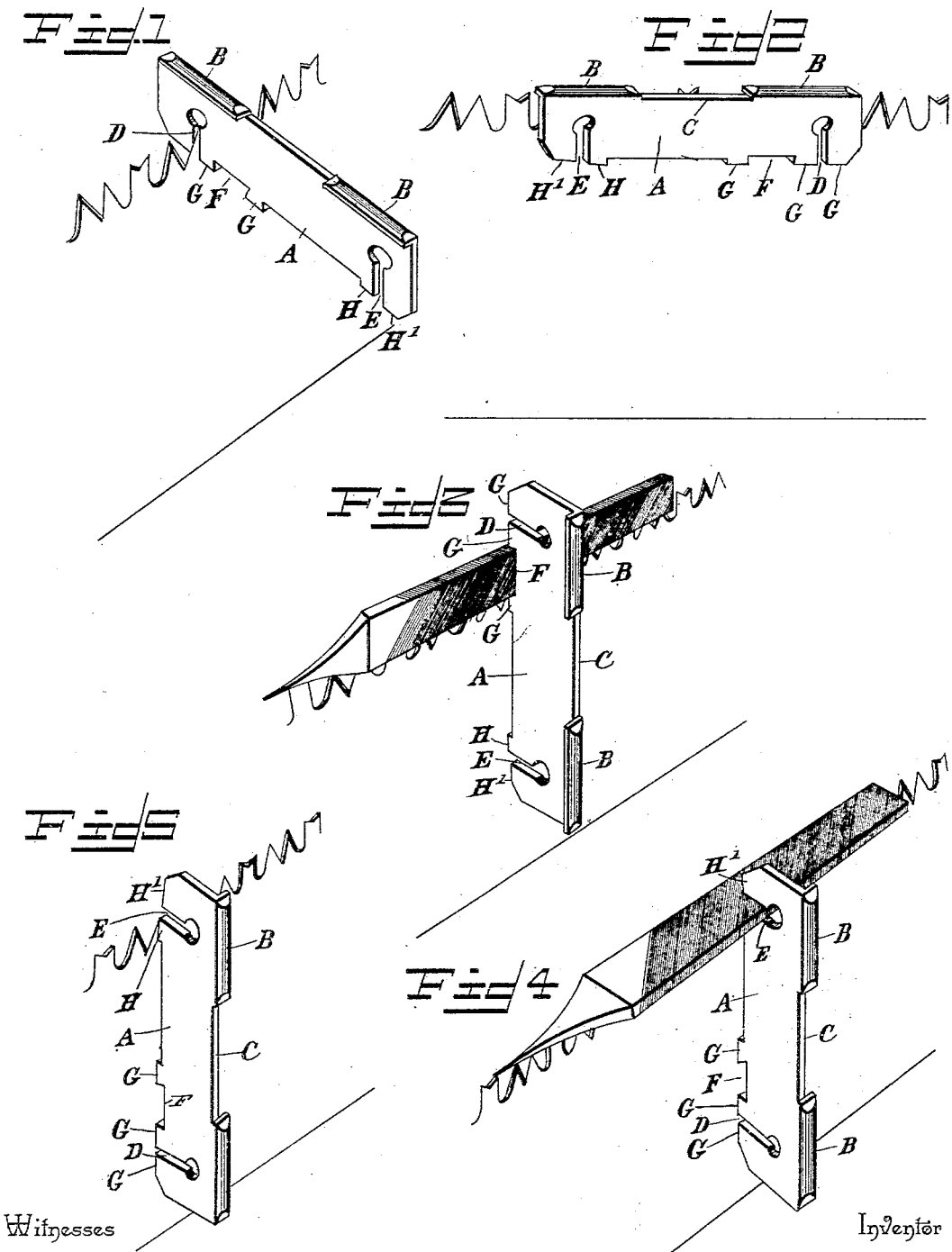

ELMER M. BICKERSTAFF, OF MILLEDGEVILLE, PENNSYLVANIA.

COMBINED SAW SET, GAGE, AND JOINTER.

SPECIFICATION forming part of Letters Patent No. 504,656, dated September 5, 1893.

Application filed March 11, 1893. Serial No. 465,563. (No model.)

*To all whom it may concern:*

Be it known that I, ELMER M. BICKERSTAFF, a citizen of the United States, residing at Milledgeville, in the county of Mercer and State of Pennsylvania, have invented a new and useful Combined Saw Set, Gage, and Jointer, of which the following is a specification.

This invention relates to a combination tool for setting, gaging and jointing saw teeth.

It has for its object to provide an improved device of the character described, which shall be constructed out of a suitable piece of metal and in a convenient size which permits of its being easily carried about the person, while at the same time providing a device which on account of being made out of a single piece has no parts which are likely to get out of order.

With these and many other objects in view which will readily appear as the nature of the invention is better understood, the same consists of the novel construction, combination and arrangement of parts, hereinafter more fully described, illustrated and claimed.

In the accompanying drawings:—Figure 1 is a perspective view of a combination tool constructed in accordance with my invention shown in position for setting the teeth of a saw. Fig. 2 is a similar view showing the tool in position as a gage for jointing the saw teeth to the proper length. Fig. 3 is a similar view of the tool illustrating the same as holding a file for side filing. Fig. 4 is a similar view of the tool carrying a file employed for jointing. Fig. 5 is a perspective view showing the device as applied for gaging the set of the saw teeth.

Referring to the accompanying drawings, A represents an elongated plate, approximately rectangular in shape, and formed out of steel or other suitable metal adapted for the uses to which said tool is placed.

The plate A, is provided at one edge with an off-standing gage flange B, which flange is adapted to rest on top of the saw teeth as clearly illustrated in Fig. 2 of the drawings, and is interrupted by a gage recess C, which forms a space in which works the file which is employed for filing down or jointing the teeth, which may be found to project above the bottom of the gage recess C, thus providing means for readily gaging and jointing the teeth to the proper length. The plate A, is further provided near each end with the slots D, and E, respectively. The setting slot D is of a size adapted to fit over the saw teeth as clearly shown in Fig. 1 of the drawings, in order to provide for twisting the same, so as to give them the proper set by exerting a slight leverage on the plate, while the other file slot E, is wider than the slot D, so as to hold a jointing file at right angles to the length of the plate, as clearly shown in Fig. 4, of the drawings, in which the plate can be slid back and forth against one side of the saw, to provide for jointing the cutting teeth thereof, which will be clear to those skilled in the art.

As clearly shown in the several figures of the drawings, what may be termed the bottom edge of the tool plate A, is provided with a file notch F, which is of a width to receive an ordinary flat file which may be wedged in said notch owing to its tapered edges, and when so inserted in such notch may be employed for side filing the saw teeth as best seen in Fig. 3 of the drawings.

Projecting from the bottom edge of the plate A, are the rest lugs G, which are in alignment with each other so as to rest flat against one side of the saw being operated upon, while at both sides of the setting slot project the differently beveled gage lugs H, and H', respectively, which are to determine the proper set of the teeth. By reference to Fig. 5, of the drawings this construction and adaptation of the tool is clearly seen, the lug H, being less sharply beveled than the lug H', so that the teeth of the saw by the use of the herein described tool can be properly gaged for cutting hard and soft wood.

From the foregoing it is thought that the construction, operation and many advantages of the herein described combination tool will be readily apparent without further description.

Having thus described my invention, what I claim, and desire to secure by Letters Patent, is—

In a combination tool of the class described, a single metallic tool plate provided at one edge with an off-standing gage flange interrupted by a gage notch or recess, separated different sized setting and file slots formed in the other edge of the plate and disposed at opposite ends respectively, a side-file notch formed in one edge of the plate near one of said slots, rest lugs projecting from one edge of the plate, and differently beveled gage lugs projecting from one edge of the plate at both sides of one of said slots, substantially as set forth.

In testimony that I claim the foregoing as my own I have hereto affixed my signature in the presence of two witnesses.

ELMER M. BICKERSTAFF.

Witnesses:
WILLIAM D. TRASK,
W. A. GEDDES.